US012466091B2

(12) United States Patent
Yarro

(10) Patent No.: US 12,466,091 B2
(45) Date of Patent: Nov. 11, 2025

(54) HAND TOOL ASSEMBLY HAVING A RETRACTABLE ATTACHMENT CLIP AND IMPLEMENT LOCK AND METHOD OF USE

(71) Applicant: XYMBIOT, INC., Orem, UT (US)

(72) Inventor: Justin Yarro, Orem, UT (US)

(73) Assignee: XYMBIOT, INC., Orem, UT (US)

( * ) Notice: Subject to any disclaimer, the term of this patent is extended or adjusted under 35 U.S.C. 154(b) by 259 days.

(21) Appl. No.: 18/140,582

(22) Filed: Apr. 27, 2023

(65) Prior Publication Data

US 2023/0347532 A1 Nov. 2, 2023

Related U.S. Application Data

(60) Provisional application No. 63/335,682, filed on Apr. 27, 2022.

(51) Int. Cl.
*B26B 1/04* (2006.01)

(52) U.S. Cl.
CPC .................................... *B26B 1/042* (2013.01)

(58) Field of Classification Search
CPC .. B26B 1/042; B26B 1/00; B26B 1/02; B26B 1/04; B26B 1/044; B26B 1/046; B26B 1/048; B26B 1/10
USPC ..... 30/161, 155, 158, 153, 160, 159; 24/3.1, 24/3.11, 3.12
See application file for complete search history.

(56) References Cited

U.S. PATENT DOCUMENTS

| | | | | |
|---|---|---|---|---|
| 2,250,290 A * | 7/1941 | Berg | B26B 1/048 30/160 |
| 2,263,415 A * | 11/1941 | Louis | B26B 1/042 30/160 |
| 7,337,486 B2 | 3/2008 | Tsuda | |
| 7,363,669 B2 | 4/2008 | Berg et al. | |
| 7,451,545 B2 * | 11/2008 | Voros | B26B 1/048 30/155 |
| 8,112,894 B2 * | 2/2012 | Caswell | A45F 5/02 30/151 |
| 8,783,141 B2 * | 7/2014 | Caswell | B26B 11/00 83/13 |
| 9,943,970 B2 | 4/2018 | Glesser | |
| 2012/0000077 A1 | 1/2012 | Caswell | |

* cited by examiner

*Primary Examiner* — Phong H Nguyen
(74) *Attorney, Agent, or Firm* — DENTONS Durham Jones Pinegar

(57) ABSTRACT

A hand tool assembly having a foldable implement, such as a blade, and a retractable attachment clip having an actuator is disclosed. A retracting assembly may be coupled to the attachment clip; the hand tool assembly may include a rotatable cam assembly comprising a rotatable cam coupled to a rotatable cam arm having a lifter; the rotatable cam may be coupled to the implement; the rotatable cam may have an off-center rotational axis; when a user rotates the implement, the rotatable cam may also be rotated, causing the position of the lifter to be moved a distance, thereby causing movement of the actuator of the attachment clip thereby actuating movement of the extendable, retractable attachment clip; the foldable hand tool may include a locking assembly having a spine having lug element and a first tooth configured to detachably mate with a first tooth-receiving slot of the implement.

16 Claims, 18 Drawing Sheets

HAND TOOL ASSEMBLY HAVING A RETRACTABLE ATTACHMENT CLIP AND IMPLEMENT LOCK AND METHOD OF USE

The title of the invention is: A HAND TOOL ASSEMBLY HAVING A RETRACTABLE ATTACHMENT CLIP AND IMPLEMENT LOCK AND METHOD OF USE; the sole inventor of the invention is Justin Varro, who is a citizen of the United States, and resides in Orem, UT.

CROSS-REFERENCE TO RELATED APPLICATIONS

The present non-provisional patent application incorporates by reference and claims the benefit of Provisional U.S. Patent Application Ser. No. 63/335,682, which was filed on Apr. 27, 2022.

STATEMENT REGARDING FEDERALLY SPONSORED RESEARCH OR DEVELOPMENT (Not applicable)

BACKGROUND OF THE INVENTION

Foldable hand tools are tools that have one or more tool implements that can be folded, into a folded configuration, or collapsed for compact storage and transportation. Various foldable hand tools use locking mechanisms to lock a foldable tool implement into an extended configuration; some of these locking mechanisms do not adequately meet some consumer expectations that the locking mechanism can be quickly and conveniently released; additionally some of these known locking mechanisms may become unlocked unexpectedly or fail at inopportune moments. See, for example, U.S. Pat. No. 7,363,669 entitled "Multipurpose locking pliers"; see also U.S. Pat. No. 7,337,486B2, entitled "Hand tool".

Foldable hand tools are popular among a variety of types of people, including outdoor enthusiasts, DIY enthusiasts, homeowners, and professionals because of their convenience and portability. One popular type of foldable hand tool is a foldable hand knife, which may be used by many types of people, including chefs and cooks, hunters and fisherfolk, outdoor enthusiasts, members of the military, law enforcement officers, gardeners and landscapers, tradespeople, collectors, and carriers of knives.

There are many types of foldable hand tools available in the market, including foldable knives, saws, pliers, wrenches, hammers, screwdrivers, and many more. These tools are designed with collapsible components such as handles, blades, or heads that can be folded or retracted into a compact size when not in use. Some types of foldable hand tools are multipurpose hand tools which include more than one foldable tool implement, and the one or more foldable tool implement that can receive interchangeable heads, such as interchangeable bit heads.

One of the main advantages of foldable hand tools is their portability. They can be easily carried in a backpack, toolbox, or even a pocket, making them ideal for those who need to carry their tools with them on the go. Users of foldable hand tools, including users of foldable knives, often want a clip that is coupled to the foldable hand tool or the foldable knives. Users may clip the hand tool or knife to various objects, such as an outer layer of a pocket or other portion of clothing, a belt, or a portion of a bag for easy and convenient access. The clip may facilitate users to carry the foldable hand tool without the need for a sheath or other carrying case. This is particularly useful for those who use their foldable hand tool for work or outdoor activities such as hunting. Having the knife easily accessible also reduces the risk of losing it, as the user is less likely to set it down and forget it. Additionally, a clip can help protect the knife from damage by preventing it from bouncing around in a pocket or bag.

For example, see U.S. Pat. No. 8,112,894B2, entitled "Retractable attachment clip for knife", some problems with retractable clips are that pressure exerted on the retractable clip may cause the clip to clamp down too tightly which could damage an object such as the pocket to which the clip is coupled to, or be released such that the clip is no longer securely coupled to an object, such as a pocket and could result in the hand tool being lost if no longer secured to an securing object. Moreover, the orientation of the clip is not in a desirable orientation being on the spine or back of the knife and counter to a traditional orientation. Additionally, users may find it inconvenient to open retractable clips that are currently available in the market. See also US Pat. App. 20120000077A1 entitled "Folding knife with non-snagging automatic pocket clip" as well as U.S. Pat. No. 8,112,894 entitled "Retractable attachment clip for knife." In this example, also the orientation of the clip is not in a desirable orientation being on the spine or back of the knife and toward the front end of the handle, which is counter to a traditional and preferred orientation.

Dangerous situations have occurred when a tool implement, such as a blade, of a foldable hand tool that is in a locked and extended configuration unexpectedly folds because a locking mechanism for locking the tool implement in an extended configuration is unable to withstand a force exerted by user who is attempting to use the tool implement, such as a blade, to perform a task. See U.S. Pat. No. 9,943,970B2 entitled "Rotational wedge locking mechanism for a folding knife" for an example of a locking mechanism. A need exists for a locking mechanism that may be quickly and easily activated by a user, while at the same time can withstand the exertion of force on the locking mechanism; for example, a hunter may want to conveniently and quickly activate the locking mechanism of a foldable knife so that the blade can be extended and used in a locked configuration, and the hunter may want to exert pressure on a knife blade to achieve a clean and precise cut, to control the direction and depth of the cut, or to sharpen the blade. Additionally, a need exists for a retractable clip that may be secreted into the handle, giving the user a flush and homogenous grip, which is desirable as opposed to a grip with an obtrusive clip. A need exists for a blade that may be easily and conveniently opened into an extended configuration, while also allowing the clip to be retracted and secreted into the handle, while providing a sufficient surface area between the clip and the main body of the foldable hand tool so as to be clipped securely to an object, and that may securely maintain the extended configuration until the user manually converts the clip into a retracted configuration.

BRIEF SUMMARY OF THE INVENTION

Applicant discloses a hand tool assembly with a retractable clip that may be secreted into the handle, giving the user a flush and homogenous grip, which is desirable as opposed to a grip with an obtrusive clip. Applicant discloses a hand tool assembly with a blade that may be easily and conveniently opened into an extended configuration, while also allowing the clip to be retracted and secreted into the handle, while providing a sufficient surface area between the clip and the main body of the foldable hand tool so as to be clipped securely to an object, and that may securely maintain the extended configuration until the user manually converts the clip into a retracted configuration.

These and other objects and features of the present invention will become more fully apparent from the following description and appended claims or may be learned by the practice of the invention as set forth hereinafter.

Applicant discloses a hand tool assembly with a locking mechanism that may be quickly and easily activated by a user, while at the same time can withstand the exertion of force on the locking mechanism; for example, a hunter may want to conveniently and quickly activate the locking mechanism of a foldable knife so that the blade can be extended and used in a locked configuration, and the hunter may want to exert pressure on a knife blade to achieve a clean and precise cut, to control the direction and depth of the cut, or to sharpen the blade.

In some aspects, the techniques described herein relate to a hand tool assembly including: an implement; a handle assembly including a left handle, a right handle, and at least one fastener; an attachment clip; the attachment clip including a clip actuator; a spine, including a main body, coupled to the handle assembly; a rotatable cam coupled to the implement; a rotatable cam arm including a proximal member and a distal member, wherein the distal member includes a rotatable cam arm lifter, wherein the proximal member of the rotatable cam arm is coupled to the rotatable cam.

In some aspects, the techniques described herein relate to a hand tool assembly, wherein the implement is a blade including a blade pivot aperture member defining a blade pivot aperture and a blade rotatable cam anchor aperture member defining an anchor aperture member, wherein the rotatable cam is coupled to the blade via a fastener disposed within the blade rotatable cam anchor aperture member and via a fastener disposed within the blade pivot aperture member.

In some aspects, the techniques described herein relate to a hand tool assembly, wherein the rotatable cam includes a pivot aperture element defining a pivot aperture, wherein the pivot aperture element is positioned off-center from a geometrical center of the rotatable cam, and wherein the attachment clip is a pocket clip.

In some aspects, the techniques described herein relate to a hand tool assembly, wherein the cam arm lifter includes a ramp.

In some aspects, the techniques described herein relate to a hand tool assembly, wherein the clip actuator includes a ramp.

In some aspects, the techniques described herein relate to a hand tool assembly, wherein the cam arm lifter includes a ramp and wherein the clip actuator includes a ramp, wherein the proximal member is ring-shaped and defines a ring-shaped cavity, wherein the rotatable cam is disposed in the ring-shaped cavity and circumscribed by the proximal member.

In some aspects, the techniques described herein relate to a hand tool assembly, the blade extending from the handle assembly, a main body of the blade being horizontally-aligned with a main body of the left handle and a main body of the right handle; the rotatable cam being in a rotated position, such that the rotatable cam arm is coupled to the clip actuator of the clip of the attachment clip and positioned so as to not extend the clip actuator, wherein the attachment clip is coupled to a pliant elongated flange coupled to the right handle.

In some aspects, the techniques described herein relate to a hand tool assembly, wherein the clip includes a clip actuator, wherein the clip is coupled to a pliant elongated flange flanked by a first channel and flanked by a second channel; the pliant elongated flange is coupled to the left handle; the pliant elongated flange is configured to be flexed so as to allow the clip to be lifted by the rotatable cam arm lifter.

In some aspects, the techniques described herein relate to a hand tool assembly, the blade not extending from the handle assembly but being in a folded configuration, such that the rotatable cam has been rotated to a position so as to position the rotatable cam arm so that the cam arm lifter is lifting the clip actuator and maintaining the attachment clip in an extended configuration; wherein the attachment clip further includes a stable support coupled to a pliant portion of the right handle.

In some aspects, the techniques described herein relate to a hand tool assembly wherein the cam arm lifter includes at least one object selected from the group consisting of a bearing assembly including a roller bearing, at least one vertically-aligned flange; a ramp, and a milled ramp.

In some aspects, the techniques described herein relate to a hand tool assembly further including a locking assembly, the locking assembly including a pliant spine including a spine flexible portion having a height; a spine flex-point element; a spine base element having a height; a spine locking tooth located at a distal end of the spine; and, at least one lug member located at the distal end of the spine.

In some aspects, the techniques described herein relate to a hand tool assembly wherein the left handle further includes a lug slot element, wherein the lug slot element includes a wide slot member; a neck; and a narrow slot member; the right handle further includes a lug slot element, wherein the lug slot element includes a wide slot member; a neck; and a narrow slot member; wherein the spine locking tooth includes a left lug member and a right lug member, wherein when the blade is in a locked configuration the left lug member is disposed within the narrow slot member of the lug slot element of the left handle; and, wherein when the blade is in a locked configuration the right lug member is disposed within the narrow slot member of the lug slot element of the right handle.

In some aspects, the techniques described herein relate to a hand tool assembly wherein the left lug member and the right lug member are substantially perpendicular to a main body of the spine.

In some aspects, the techniques described herein relate to a hand tool assembly wherein the height of the spine flexible portion is less than the height of the spine base element.

In some aspects, the techniques described herein relate to a method for using a hand tool assembly having a blade in an extended configuration and an attachment clip in a retracted configuration, including the following steps: providing a hand tool assembly including a handle assembly; an attachment clip including a clip and a clip actuator; a blade coupled to a rotatable cam, the rotatable cam being coupled to a rotatable cam arm, the rotatable cam arm including a rotatable cam arm lifter; the blade including a blade pivot aperture member wherein a barrel pivot nut is disposed within the blade pivot aperture member, wherein the barrel pivot nut is coupled to the handle assembly; wherein in the rotatable cam is coupled to the rotatable cam arm and disposed within the proximal member of the rotatable cam arm, the clip being coupled to a pliant elongated flange; rotating the blade around a longitudinal axis of the barrel pivot nut and simultaneously rotating the rotatable cam and disposing the blade of the hand tool assembly within the handle assembly, and, continuing to rotate the rotatable cam via rotating the blade until the blade is in a closed configuration, thereby positioning the cam arm lifter in a proximal configuration such that the cam arm lifter is lifting the clip actuator while extending the clip of the attachment clip from the handle assembly.

In some aspects, the techniques described herein relate to a method of using a hand tool assembly, further including the steps of detachably clamping the attachment clip onto an object selected from the group consisting of a layer of clothing and a belt.

In some aspects, the techniques described herein relate to a method of using a hand tool assembly, further including the steps of unclamping the attachment clip from the object; unfolding the blade of the hand tool assembly while simultaneously rotating the cam and the cam arm until the cam arm lifter no longer is lifting the clip actuator and the attachment clip is retracted into the handle assembly.

BRIEF DESCRIPTION OF THE DRAWINGS

The preferred embodiments of the present invention will be described in conjunction with the appended drawings. Like designations denote like elements, and.

DETAILED DESCRIPTION

Although references are made to a left handle and a right handle, as well as certain features in each of the handles, various embodiments contemplate some or all of the features of the left handle being implemented in the right handle and vice versa.

The spine may be pliant. The height spine flexible portion may be less than, equal to, or greater than the height of the spine base element.

Figure 1:
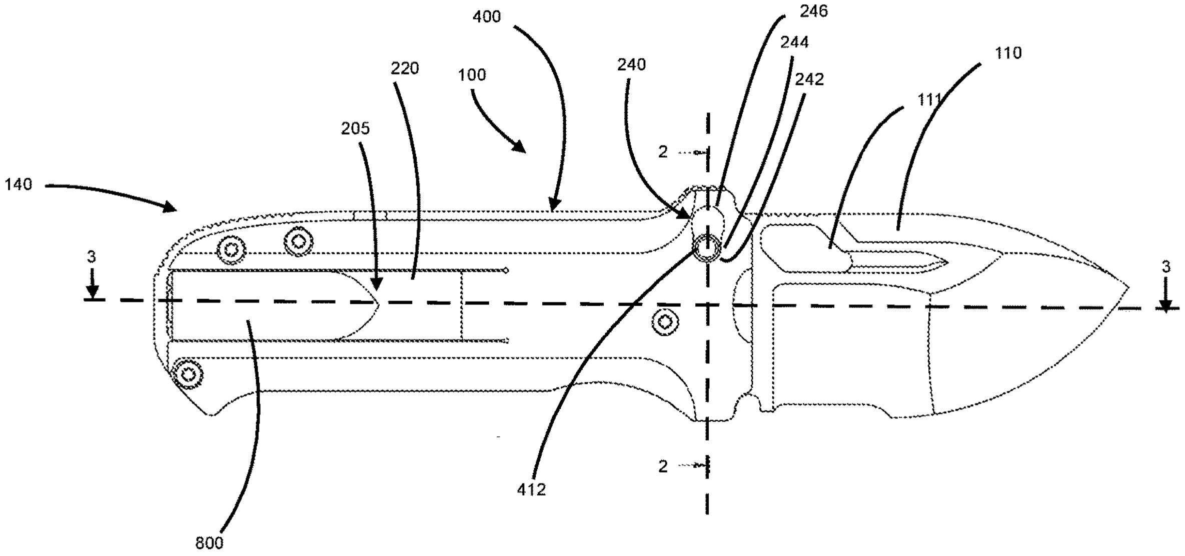
FIG. 1 is a right-side view of an exemplary embodiment of a hand tool assembly.

Referring to FIG. 1, a right side view of an exemplary embodiment of a hand tool assembly 100 is shown; right handle 200 is depicted; in some preferred embodiments, the right handle 200 may have at least one lug slot element 240, which may be a portion of right handle 200 configured to define a lug slot; in some preferred embodiments, the size of the lug slot element 240 is large enough to partially dispose a lug. The lug slot element 240 of right handle 200 may define a lug slot for receiving the right lug member 412 of the lug 410; the lug slot element 240 may have in some preferred embodiments, a narrow slot member 242, a neck 244, and a wide slot member 246. In some embodiments, right handle 200 may be formed from a material that may flex such that when a right lug member 412 of a lug 410 is lowered from the area of the lug slot defined by the wide slot member 246 into the area of the lug slot defined by the narrow slot member 242, then the narrow slot member 242 may snugly fit around a portion of the right lug member 412, thereby reducing the likelihood that the right lug member 412 may be unintentionally dislodged from being partially disposed within the narrow slot member 242, thereby reducing the likelihood that the blade will be unintentionally moved into an unlocked position.

The blade 110 may have a nail nick 111; nail nick 111 may define a nail nick notch.

Figure 27:
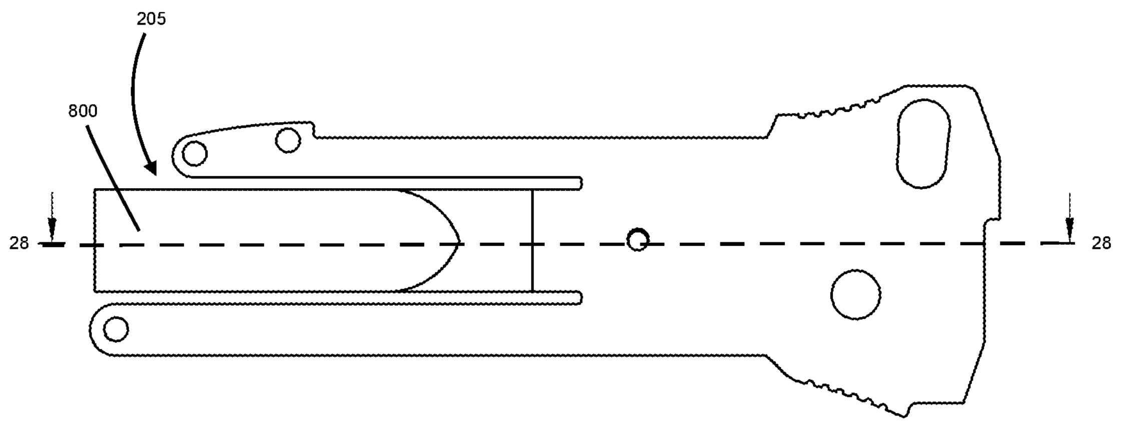
FIG. 27 shows a right-side view of an embodiment of a right handle.
Figure 28:
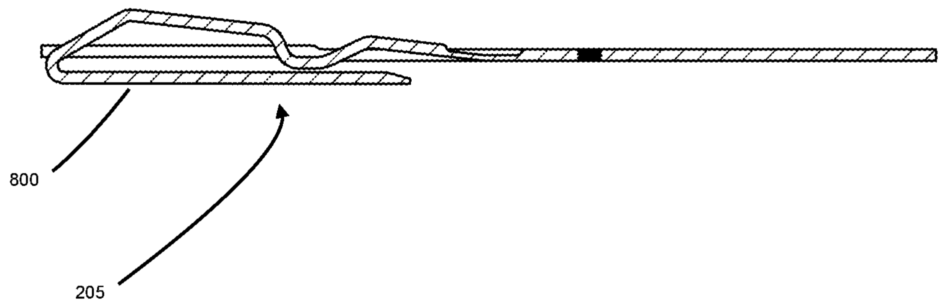
FIG. 28 shows a cross-sectional view of the embodiment of the right handle shown in FIG. 27.

Attachment clip 205 may comprise a pliant elongated flange 220 detachably coupled to or undetachably coupled to a liftable clip 800. (In the drawings, FIG. 27 and FIG. 28 show a clip that is undetachably coupled to the pliant elongated flange, but here in FIG. 1 and in the other figures, the embodiment of liftable clip 800 is depicted as detachable.) The liftable clip 800 may be flexible and configured to removably and securely clamp onto a portion of clothing, such as the outer portion of a pant pocket or a belt.

An upper portion of spine 400 is shown; the hand tool assembly 100 is shown in a locked configuration and the blade 110 is in a retracted configuration. Four fasteners are shown; liftable clip 800 is shown.

Figure 2:
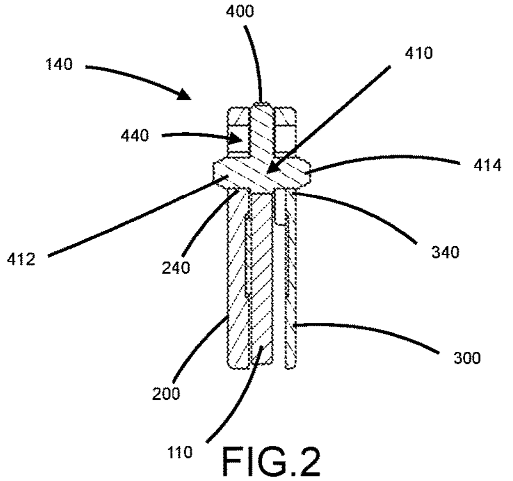
FIG. 2 is a cross-sectional, front view of an exemplary embodiment of the hand tool assembly depicted in FIG. 1.

Referring to FIG. 2, a cross-sectional, front view of an exemplary embodiment of the hand tool assembly 100 depicted in FIG. 1 is shown; the plane upon which the sectional view of FIG. 2 is taken is indicated in FIG. 1 by the broken line that is labeled 2. Spine 400, which may be flexible, is shown having a transverse lug 410 extending past the handles on both sides. A right lug member 412 may be partially disposed within a lug slot element 240 of right handle 200; a left lug member 414 may be partially disposed within a lug slot element 340 of left handle 300 so as to improve the strength of the locking assembly, the lug element also may provide users with a structure usable for unlocking the implement of the hand tool assembly. The right handle 200 and left handle 300 may substantially surround a blade 110. Left handle 300 may have a channel 302 (more easily seen in FIGS. 20-22) that defines an area for the rotatable cam arm 600 to rotate within the channel 302; left handle 300 may also provide a lower portion configured to be a structural support upon which the rotatable cam arm 600 may press against when lifting the clip actuator of the clip (which is not shown in this figure).

Figure 3:
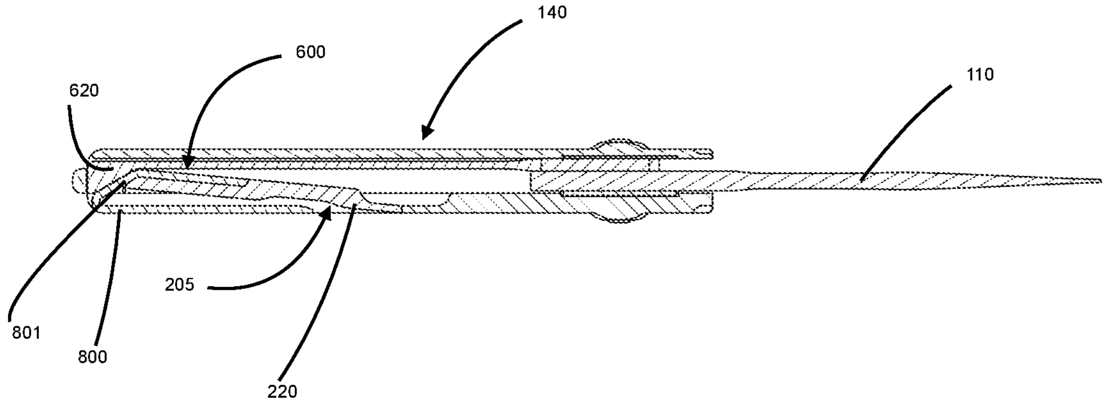
FIG. 3 is a cross-sectional, top view of an exemplary embodiment of the hand tool assembly depicted in FIG. 1.

Referring to FIG. 3, which is a cross-sectional, top view of an exemplary embodiment of the hand tool assembly depicted in FIG. 1; the plane upon which the sectional view of FIG. 3 is taken is indicated in FIG. 1 by the broken line that is labeled 3. The implement, which is a blade 110 in this embodiment, is configured in the locked configuration; the spatial relationship, in this depiction of some embodiments, between the rotatable cam arm 600 and the attachment clip 205 is shown; the pliant elongated flange 220 is shown coupled to the attachment clip 205; the attachment clip 205, which is coupled to liftable clip 800, is in the retracted configuration. Clip actuator 801 may be the portion of the liftable clip 800 that is configured to be lifted by cam arm lifter 620; in some embodiment of hand tool assembly 100, as shown in this figure, a ramp of clip actuator 801 nestles with a ramp of cam arm lifter 620 such that cam arm lifter 620 is not lifting liftable clip 800 beyond its resting configuration.

Figure 4:
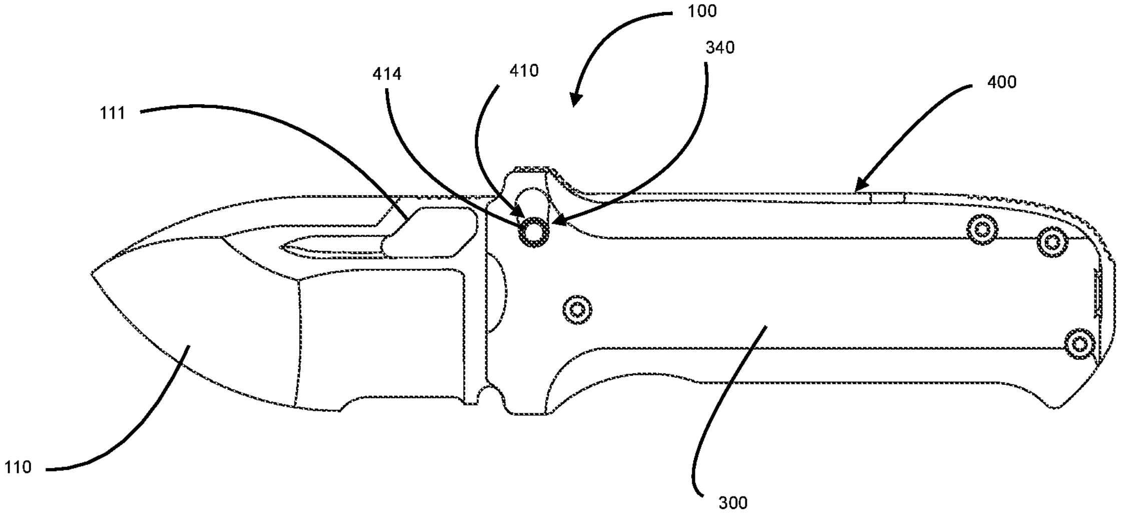
FIG. 4 is a left side view of an exemplary embodiment of a hand tool assembly.

Referring to FIG. 4, a left side view is shown of an exemplary embodiment of a hand tool assembly 100; the blade 110 is configured in the locked configuration with the blade 110 extended. Lug 410 may have a left lug member 414, which may be partially disposed within lug slot element 340, which may define a lug slot, of left handle 300 so as to improve the strength of the locking assembly, the lug 410 also providing users with a means to unlock the implement of the hand tool assembly. For purposes of this disclosure, the locking assembly may include spine 400, blade 110, right handle 200, and left handle 300, as well as corresponding fasteners such that spine 400 is coupled via at least one fastener to right handle 200, is coupled via at least one fastener to left handle 300, and is detachably coupled to blade 110 via spine locking tooth 440, and in some embodiments is detachably coupled to blade 110 via choil flange 452. The blade 110 may have a nail nick 111; nail nick 111 may define a nail nick notch.

Figure 5:
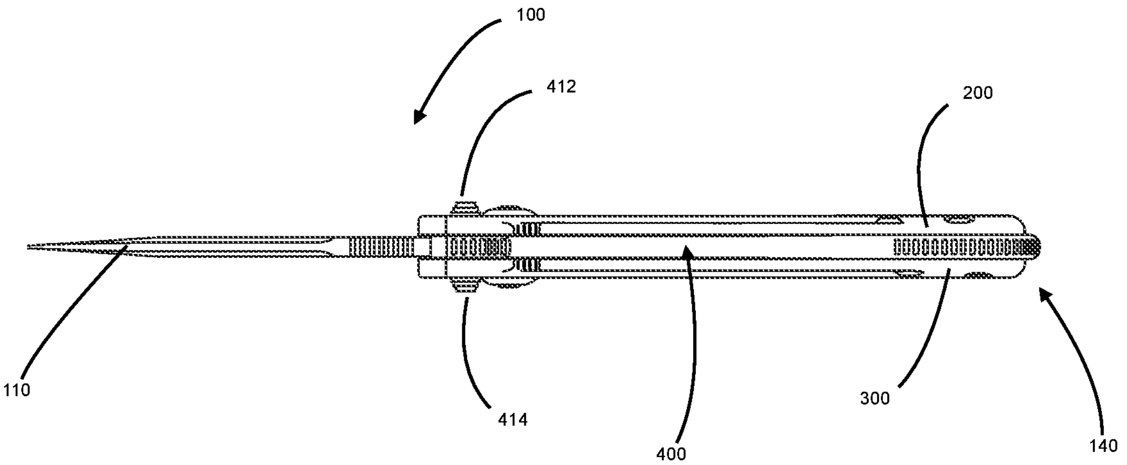
FIG. 5 is a top view of the embodiment of the hand tool assembly shown in FIG. 1.

Referring to FIG. 5, a top view is shown of the embodiment of the hand tool assembly 100 shown in FIG. 1; the blade 110 is configured in the locked configuration; the attachment clip 205 is fully retracted into handle assembly 140 so as to not be visible from this view. (Handle assembly 140 comprises right handle 200, left handle 300, and corresponding fasteners.)

Figure 6:
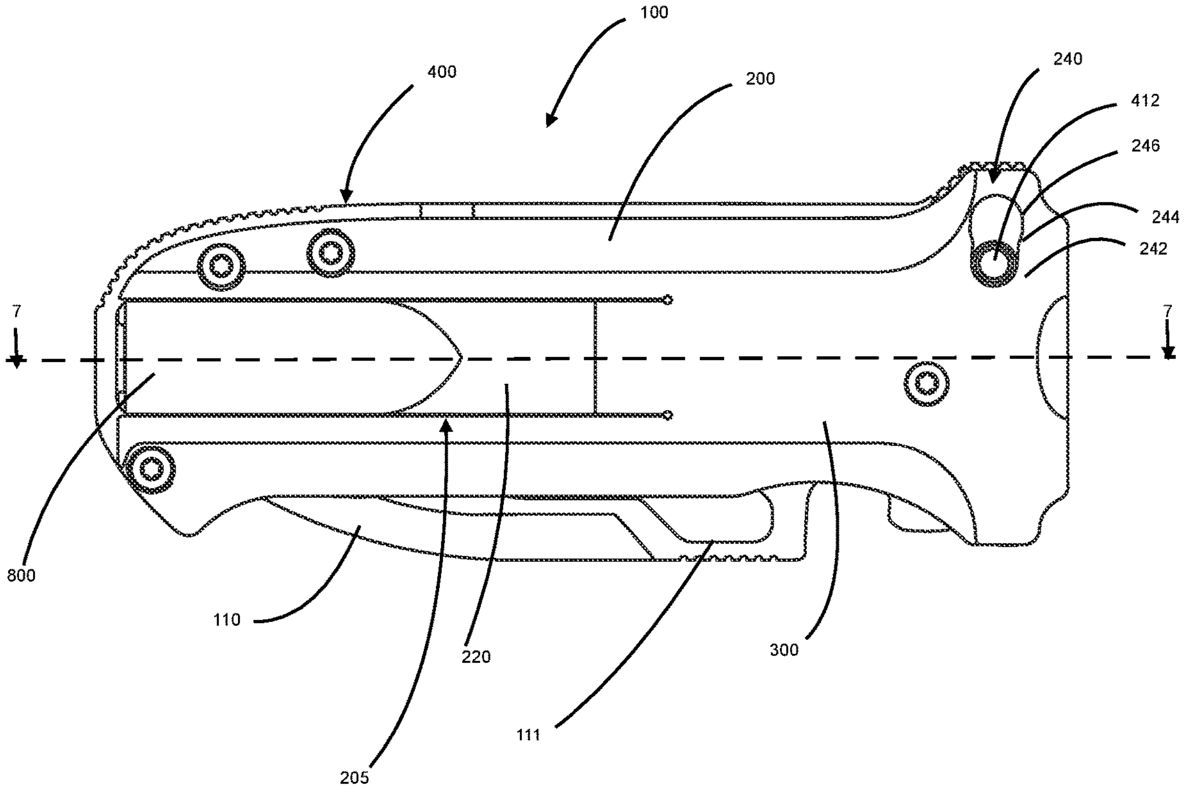
FIG. 6 is a right-side view of and exemplary embodiment of a hand tool assembly wherein the implement is folded.

Referring to FIG. 6, a right-side view is shown of an exemplary embodiment of a hand tool assembly 100 wherein the implement is folded; in this specific embodiment the hand tool assembly 100 is a knife assembly, and the implement is a blade 110. Spine 400 is coupled to right handle 200; right lug member 412 is disposed within lug slot element 240. Lug slot element 240 has a narrow slot member 242, a neck 244, and a wide slot member 246. Right handle 200 has an attachment clip 205 that extends from the body of the right handle 200; attachment clip 205 may have a pliant elongated flange 220; in some preferred embodiments, the attachment clip 205 may be aligned along its upper edge by a first channel and also may be aligned along its lower edge by a second channel, thereby allowing the attachment clip 205 to flex; attachment clip 205 may be flexed into a retracted configuration; attachment clip 205 may also be flexed into an extended configuration. The blade 110 may have a nail nick 111; nail nick 111 may define a nail nick notch.

Figure 7:
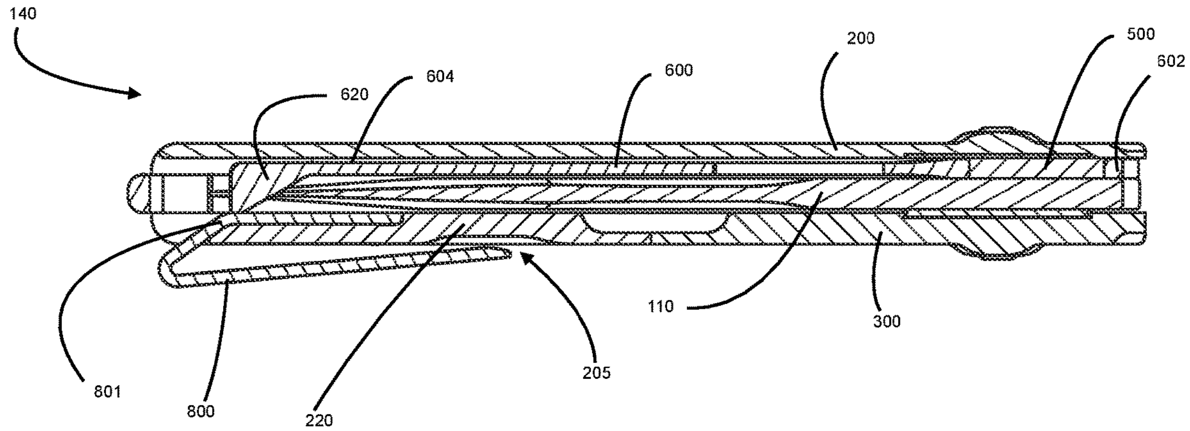
FIG. 7 is a cross-sectional, top view of an exemplary embodiment of the hand tool assembly depicted in FIG. 6.

Referring to FIG. 7, a cross-sectional, top view is shown of an exemplary embodiment of the hand tool assembly 100 depicted in FIG. 6, including rotatable cam 500; the plane upon which the sectional view of FIG. 7 is taken is indicated in FIG. 6 by the broken line that is labeled 7. In some embodiments, when the blade is folded, the rotatable cam arm 600 may not be completely parallel to the longitudinal body of the handle, as shown in FIG. 7 where the plane upon which sectional view of FIG. 7 is taken does not travel through the entire rotatable cam arm 600; In FIG. 7, the blade 110 is folded and the relationship between the rotatable cam arm 600, the proximal member 602 of the rotatable cam arm 600, and the attachment clip 205 is shown; in this configuration of the embodiment shown in FIG. 7, the rotatable cam arm 600 is lifting the attachment clip 205; the attachment clip 205, having a liftable clip 800, is coupled to the pliant elongated flange 220 and the attachment clip 205 is configured so as to extend from the right handle 200; the attachment clip 205 is in its fully extended position; attachment clip 205 may be adjacent to pliant elongated flange 220; the proximal member 602 of the rotatable cam arm 600 may define a proximal member cavity; the rotatable cam 500 may be detachably disposed within the proximal member cavity. Clip actuator 801 is shown in this embodiment, as depicted in this figure, as being fully lifted by cam arm lifter 620, thereby actuating the attachment clip into an extended configuration wherein the attachment clip is sufficiently open to be clipped to an object such as a pant pocket or belt. In some embodiments, attachment clip 205 comprises liftable clip 800 and pliant elongated flange 220.

Figure 8:
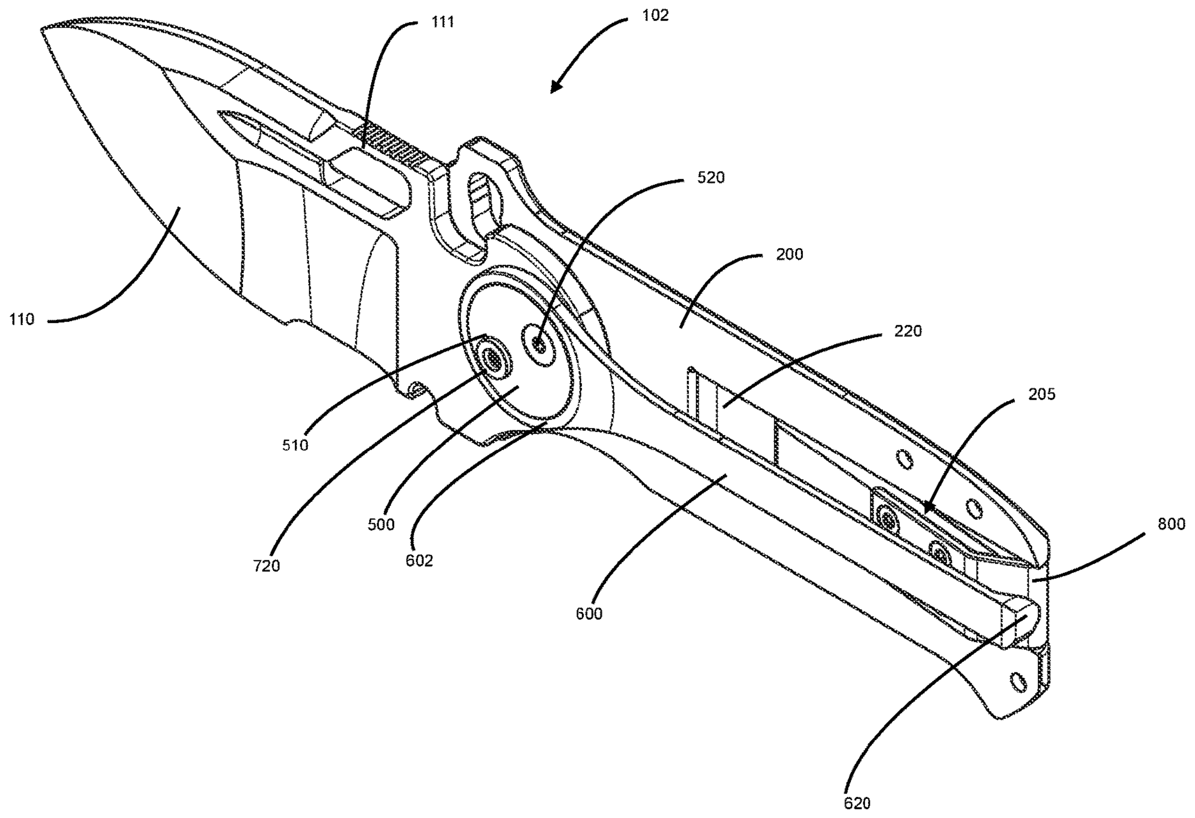
FIG. 8 depicts a left side view of an embodiment of a partially assembled hand tool assembly, wherein the spine and the left handle are not depicted.

Referring to FIG. 8, a first partially-assembled hand tool assembly 102 is shown wherein left handle 300 and spine 400 have been removed; right handle 200 is shown; rotatable cam 500 is shown disposed within proximal member 602 of the rotatable cam arm 600; rotatable cam 500 may have a rotatable cam mount aperture element 520 defining a rotatable cam mount hole; a rotatable cam mount fastener 530 may be fastened to rotatable cam mount aperture element 520, which may be threaded, and also to a portion of blade 110, which may be threaded in some preferred embodiments so as to receive a threaded fastener. Rotatable cam 500 may have a pivot aperture element 510 defining a pivot hole; barrel nut 720 may be disposed within the pivot aperture so that the blade 110 may be rotated around an axis of rotation, wherein the axis of rotation may pass longitudinally through a main cavity of the barrel nut 720; wherein the axis of rotation of the rotatable cam may be off-center from geometrical center of the rotatable cam; in this FIG. 8, an end of barrel nut 720 is shown protruding from pivot aperture element 510 of rotatable cam 500. The rotatable cam arm 600, the proximal member 602, and the rotatable cam 500 may be aligned, as shown in this embodiment in this figure, such that a second barrel nut fastener 362, which is not show in FIG. 8, may be fastened to barrel nut 720. As shown in this FIG. 8, the barrel nut 720 may be positioned such that a second barrel nut fastener 362 may be enter into the portion of the barrel nut 720 that is facing the viewer. Rotatable cam mount aperture element 520 of rotatable cam 500 is shown, and a rotatable cam mount fastener 530 may be fastened to both the rotatable cam mount aperture element 520, which may be threaded, and the blade rotatable cam anchor aperture member 130, which may be threaded, so as to anchor the rotatable cam 500 to the blade 110, which, in the preferred embodiments, allows the rotation of the blade 110 to also cause the rotatable cam 500 to be simultaneously rotated. Pliant elongated flange 220 may be coupled to right handle 200.

In the preferred embodiments, the axis of the rotation for the rotatable cam 500 may not pass through the center of the rotatable cam 500, such that the axis of rotation for the rotatable cam is located at or within the pivot aperture that is defined by 510 and is off set from the center of the rotatable cam 500.

As depicted in this FIG. 8, embodiments of rotatable cam arm 600 may be configured to not lift the liftable clip 800 of the attachment clip 205. In some embodiments, as shown in FIG. 8, attachment clip 205 may comprise a pliant elongated flange 220 detachably coupled to a liftable clip 800. The position of the rotatable cam 500 may cause the rotatable cam arm 600 to be positioned in a substantially distal position such that the cam arm lifter 620, which may be located distal to the proximal member 602 is not lifting the pocket clip, thereby, causing the attachment clip 205 to be retracted into right handle 200, wherein attachment clip 205 may be partially-disposed within the right handle 200 of a handle assembly such that the upper planar surface of the liftable clip 800 is substantially is substantially level with the upper surface of the right handle 200. The blade 110 may have a nail nick 111; nail nick 111 may define a nail nick notch.

Clip actuator 801 is shown in this embodiment, as depicted in this figure, as not being substantially lifted by cam arm lifter 620.

Figure 9:
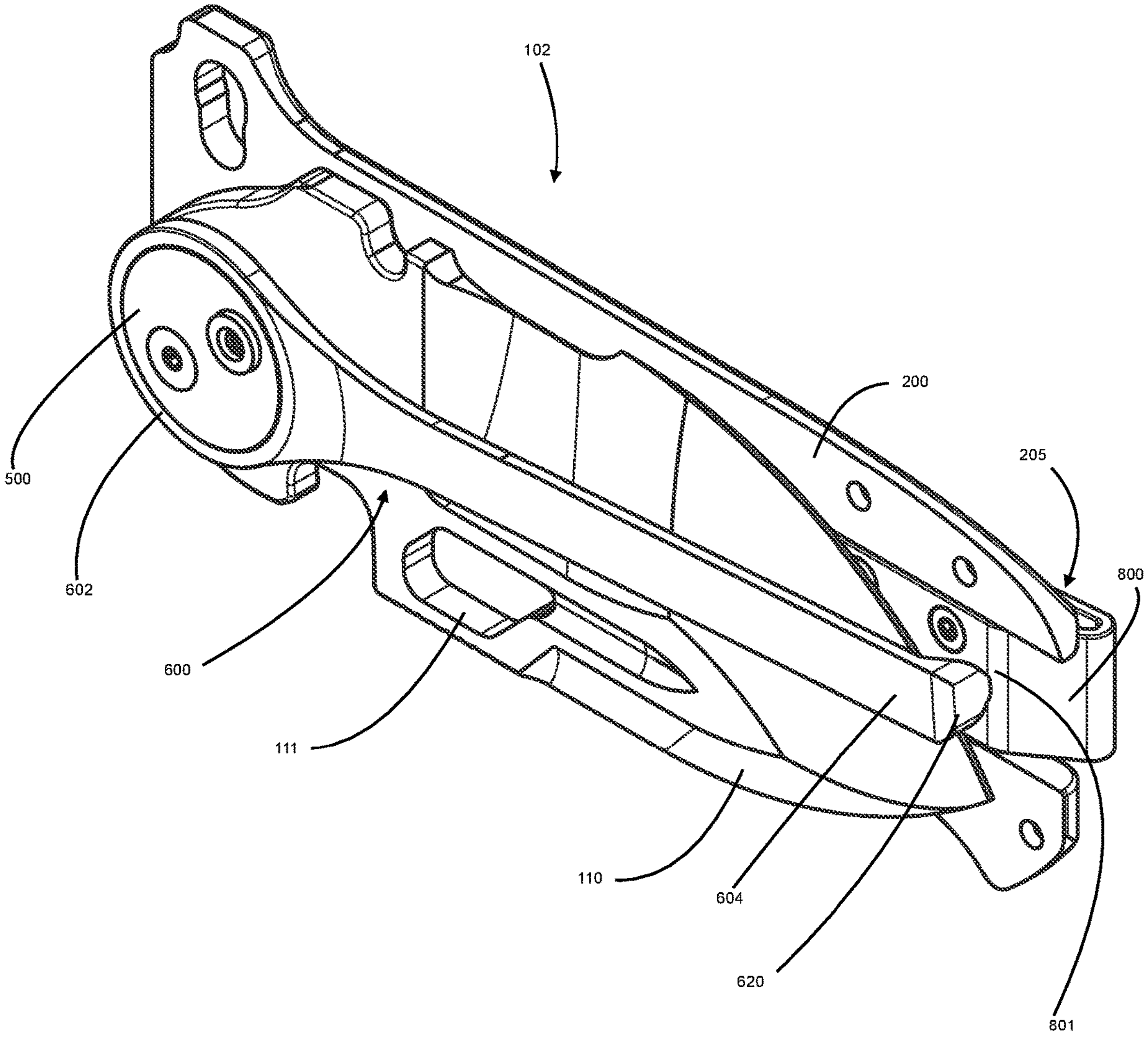
FIG. 9 is a left side perspective view of an embodiment of a partially assembled hand tool assembly in a folded configuration; the spine and the left handle are not depicted.

Referring to FIG. 9, a left side perspective view of an embodiment of a partially-assembled hand tool assembly 102 in a folded configuration, the folding of the blade 110 into a folded configuration has caused the rotation of rotatable cam 500 such that the pivot aperture element 510 of rotatable cam 500 is in proximal position and the rotatable cam arm 600 is brought to a substantially proximal position, thereby bringing the cam arm lifter 620 into a proximal position. In some embodiments, such as the embodiments depicted in FIG. 9, an angle of the angled surface of the cam arm lifter 620 is such that the highest portion of the cam arm lifter 620 may exert a force on the liftable clip 800 sufficient to lift the liftable clip 800, thereby extending the liftable clip 800, wherein a cam arm lifter 620 of rotatable cam arm 600 may be located distal to the proximal member 602 the distal member 604 of the rotatable cam arm 600 comprises a cam arm lifter 620 that is positioned to substantially lift the pocket clip 205. FIG. 9 is; the spine and the left handle are not depicted; the rotatable cam arm is shown positioned detachably coupled to the clip; the rotatable cam arm is in a proximal position such that the lifter of the rotatable cam arm is lifting the actuator of the pocket clip, thereby lifting the attachment clip; the proximal member of the rotatable cam arm fully surrounds the rotatable cam; because the proximal member of the rotatable cam arm is coupled to the rotatable cam, the rotatable cam is coupled to the blade, and the blade has been folded, then the rotatable cam arm has been shifted into a proximal configuration such that the lifter of the rotatable cam arm is lifting the actuator of the attachment clip. Clip actuator 801 is shown in this embodiment, as depicted in this figure, being fully lifted by cam arm lifter 620. The blade 110 may have a nail nick 111; nail nick 111 may define a nail nick notch.

Figure 10:
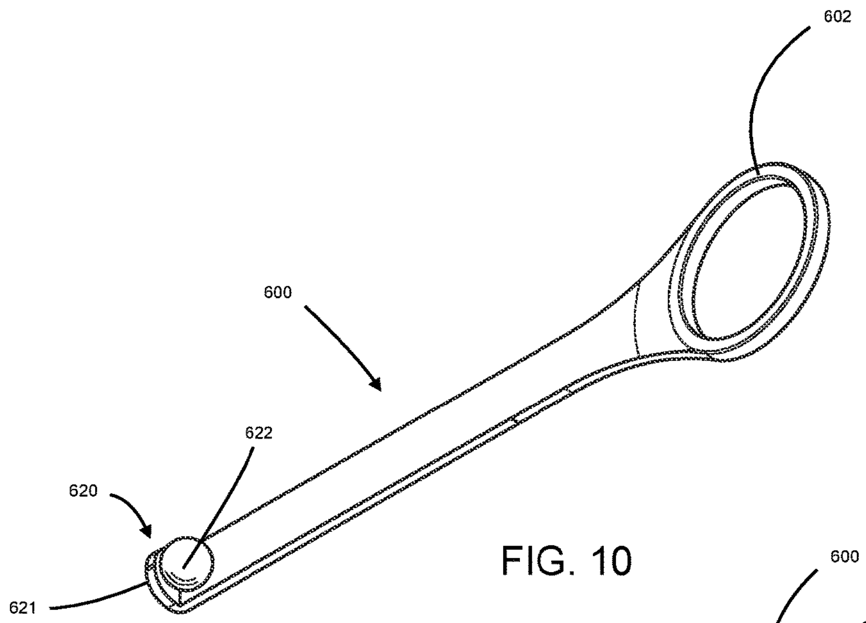
FIG. 10 shows an embodiment of a rotatable cam arm having a proximal member and a rotatable cam arm lifter.

Referring to FIG. 10, a perspective view is shown of a rotatable cam arm 600 having a proximal member 602 and a cam arm lifter 620. Cam arm lifter 620 may comprise an element, and the element may be of various shapes and sizes so long as the element is configured to press against an actuator when the element is moved. In the embodiment that is depicted in FIG. 10, cam arm lifter 620 may comprise a spherical element 622 that may be coupled to a stopper 621. Spherical element 622 may be a metal ball, plastic ball, or other ball made from a low-friction material. The spherical element 622 may slide against clip actuator 801.

Figure 11:
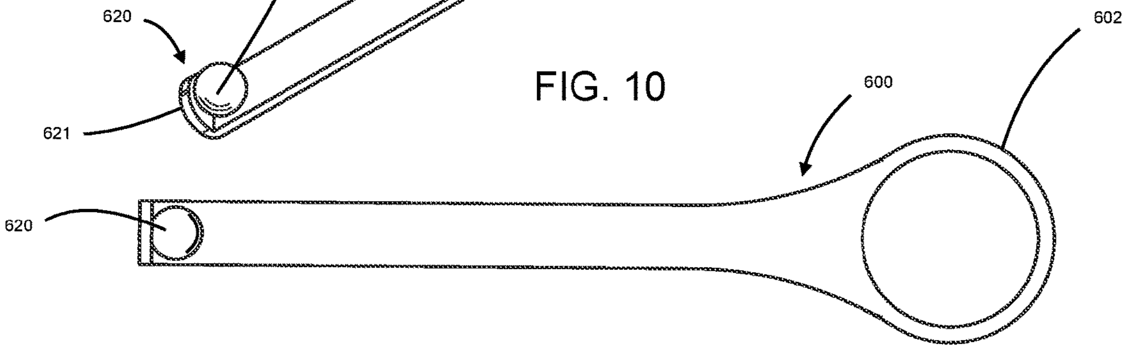
FIG. 11 shows a plan view of the embodiment depicted in FIG. 10 of a rotatable cam arm having a proximal member and a rotatable cam arm lifter.

Referring to FIG. 11, a plan view is shown of the embodiment depicted in FIG. 10 of a rotatable cam arm 600 having a proximal member 602 and a cam arm lifter 620.

Figure 12:
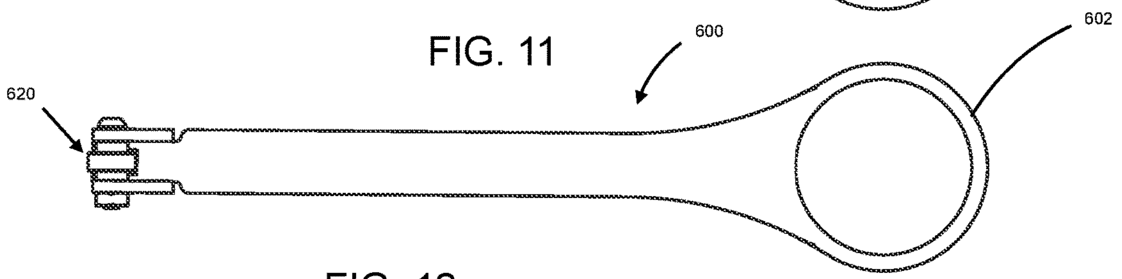
FIG. 12 shows a plan view of an embodiment of a rotatable cam arm having a proximal member and a rotatable cam arm lifter.

Referring to FIG. 12, a plan view is shown of an embodiment of a rotatable cam arm 600 having a proximal member 602 and a cam arm lifter 620.

Figure 13:
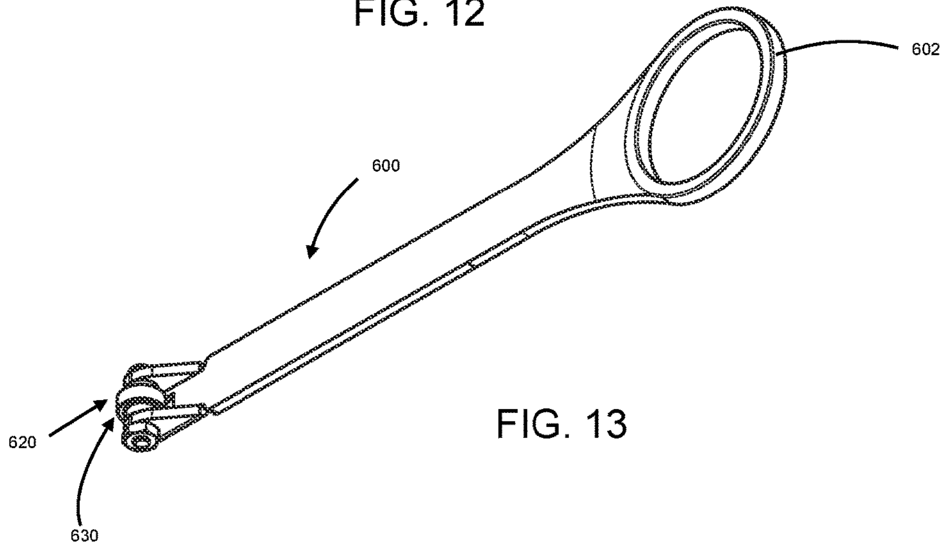
FIG. 13 shows a perspective view of the embodiment shown in FIG. 12 of the rotatable cam arm having a proximal member and a rotatable cam arm lifter.

Referring to FIG. 13, a perspective view is shown of the embodiment shown in FIG. 12 of the rotatable cam arm 600 having a proximal member 602 and a cam arm lifter 620. In some embodiments, cam arm lifter 620 comprises a bearing assembly 630, which may be a roller bearing assembly in some embodiments or a low friction bearing assembly in some embodiments.

Figure 14:
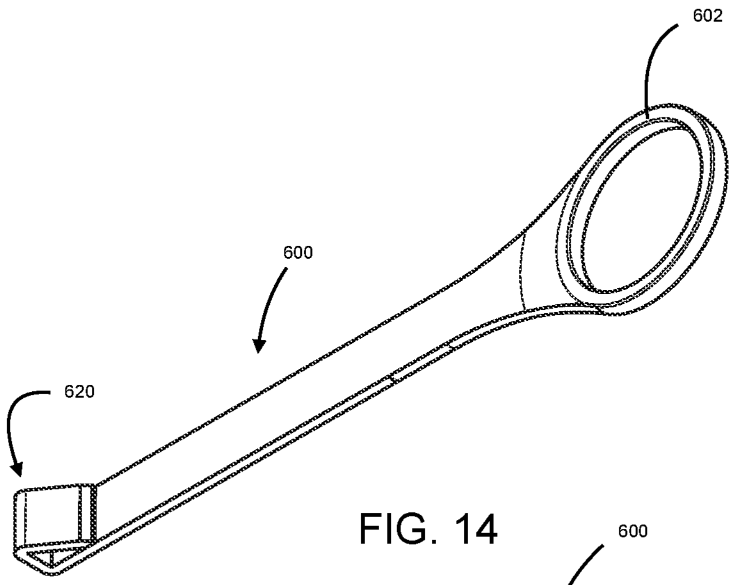
FIG. 14 shows a perspective view of an embodiment of a rotatable cam arm having a proximal member and a rotatable cam arm lifter.

Referring to FIG. 14, a perspective view is shown of an embodiment of a rotatable cam arm 600 having a proximal member 602 and a cam arm lifter 620. In some embodiments, as shown in FIG. 14, the cam arm lifter 620 comprises an angled element that may be formed by bending an extended distal portion of a rotatable cam arm 600 such that the extended distal portion of the rotatable cam arm 600 forms an acute angle with the main body of the rotatable cam arm 600, which may form a ramp. The ramp may be made from metal, plastic, or some other low-friction material.

Figure 15:
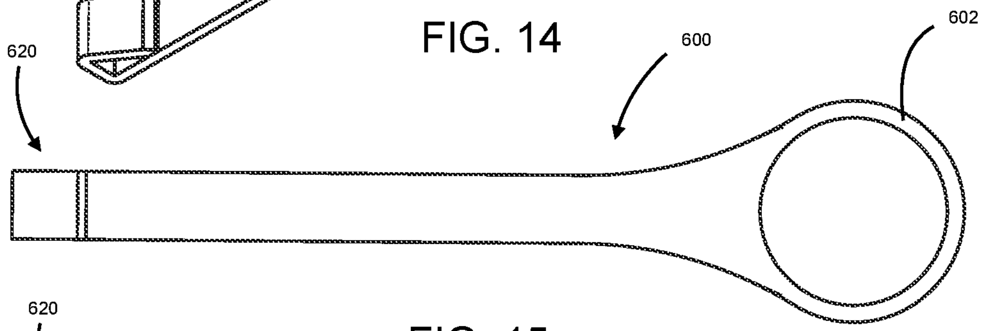
FIG. 15 shows a plan view of the embodiment shown in FIG. 14 of a rotatable cam arm having a proximal member and a rotatable cam arm lifter.

Referring to FIG. 15, a plan view is shown of the embodiment shown in FIG. 14 of a rotatable cam arm 600 having a proximal member 602 and a cam arm lifter 620.

Figure 16:
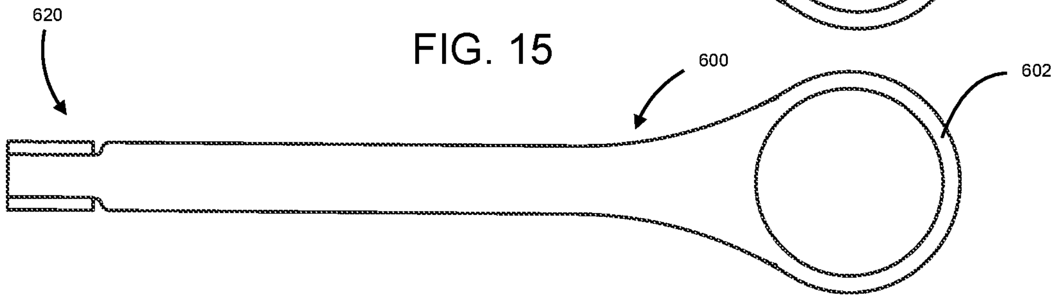
FIG. 16 shows a plan view of an embodiment of a rotatable cam arm having a proximal member and a rotatable cam arm lifter.

Referring to FIG. 16, a plan view is shown of an embodiment of a rotatable cam arm 600 having a proximal member 602 and a cam arm lifter 620.

Figure 17:
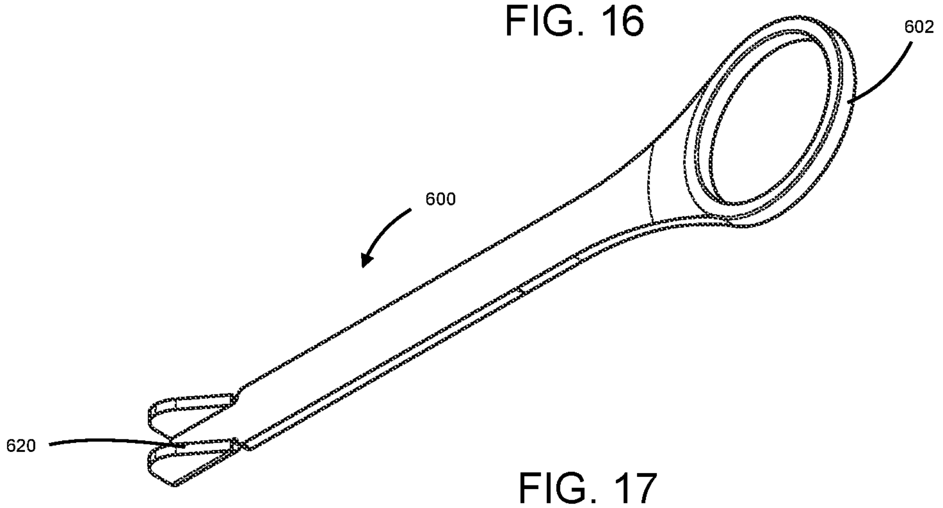
FIG. 17 shows a perspective view of the embodiment shown in FIG. 16 of a rotatable cam arm having a proximal member and a rotatable cam arm lifter.

Referring to FIG. 17, a perspective view is shown of the embodiment shown in FIG. 16 of a rotatable cam arm 600 having a proximal member 602 and a cam arm lifter 620. In some embodiments, as shown in FIG. 17, the cam arm lifter

620 may comprise one or more vertically aligned flanges; the embodiment depicted in FIG. 17 shows two vertically-aligned flanges.

Figure 18:
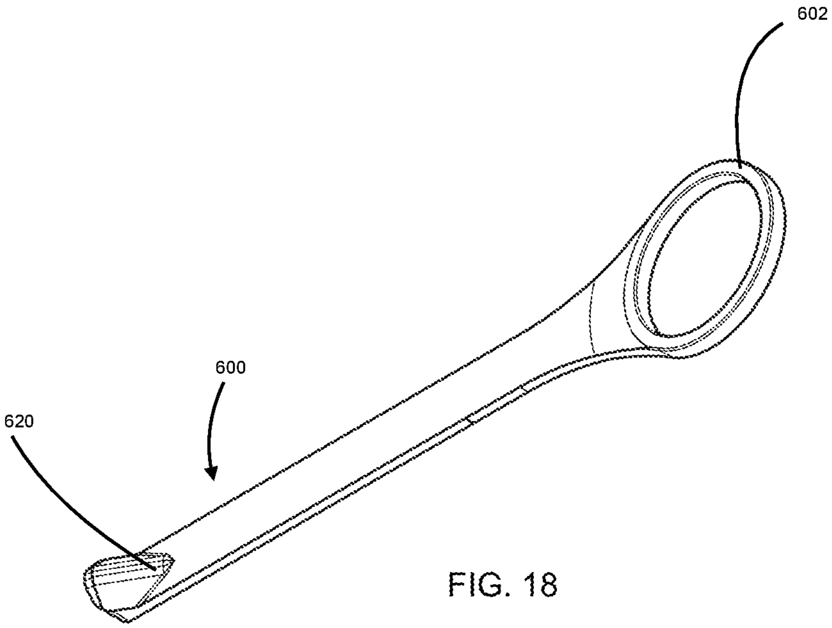
FIG. 18 shows a perspective view of a rotatable cam arm having a proximal member and a rotatable cam arm lifter.

Referring to FIG. 18, a perspective view is shown of a rotatable cam arm 600 having a proximal member 602 and a cam arm lifter 620; In some embodiments, as shown in FIG. 18, cam arm lifter 620 may be a milled ramp. The cam arm lifter 620 may be of various shapes, which may have angled surfaces of various degrees; in some embodiments, the cam arm lifter 620 is milled, but in other embodiments, cam arm lifter 620 may be formed by other methods known in the arts.

Figure 19:
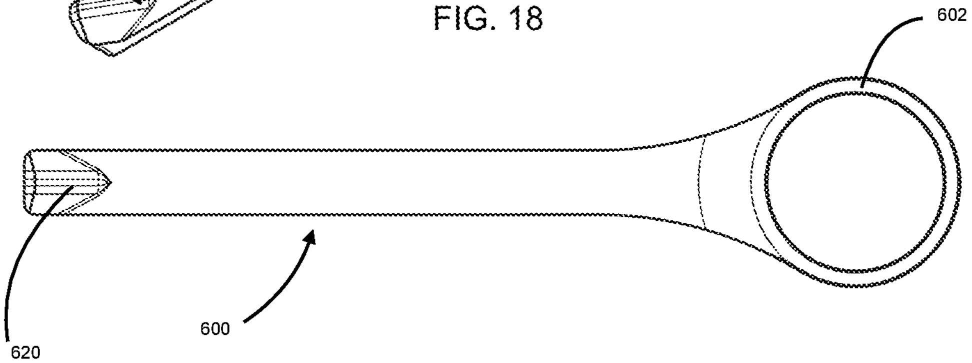
FIG. 19 shows a plan view of the embodiment shown in FIG. 18 of a rotatable cam arm having a proximal member and a rotatable cam arm lifter.

Referring to FIG. 19, shows a plan view of the embodiment shown in FIG. 18 of a rotatable cam arm 600 having a proximal member 602 and a cam arm lifter 620.

Figure 20:
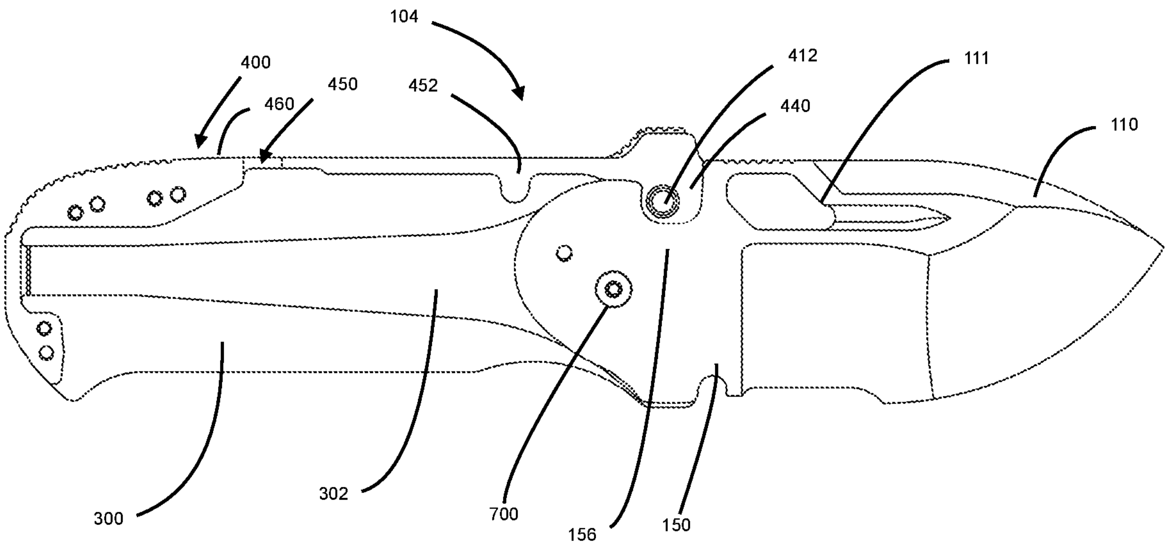
FIG. 20 is a right-side view of an embodiment of a blade-barrel pivot nut-spine-right handle assembly.

Referring to FIG. 20, a right-side view is shown of a blade-barrel pivot nut-spine-right handle assembly 104 comprising a blade 110, a barrel pivot nut 700, a spine 400, and a right handle 200, with the blade extended and in a locked configuration. Spine 400, which may be pliant in some preferred embodiments, may have a choil flange 452, which may be detachably coupled to the choil 150 of the blade 110 when the blade is in a folded configuration (FIG. 20 does not show the blade 110 in a folded configuration). In some embodiments, as shown in FIG. 20, when the blade 110 is in a locked configuration, spine locking tooth 440 may be detachably coupled to blade groove member 156 and may be disposed within a blade groove that is defined by blade groove member 156, thereby locking blade 110 in a locked configuration. The blade 110 may have a nail nick 111; nail nick 111 may define a nail nick notch.

Figure 21:
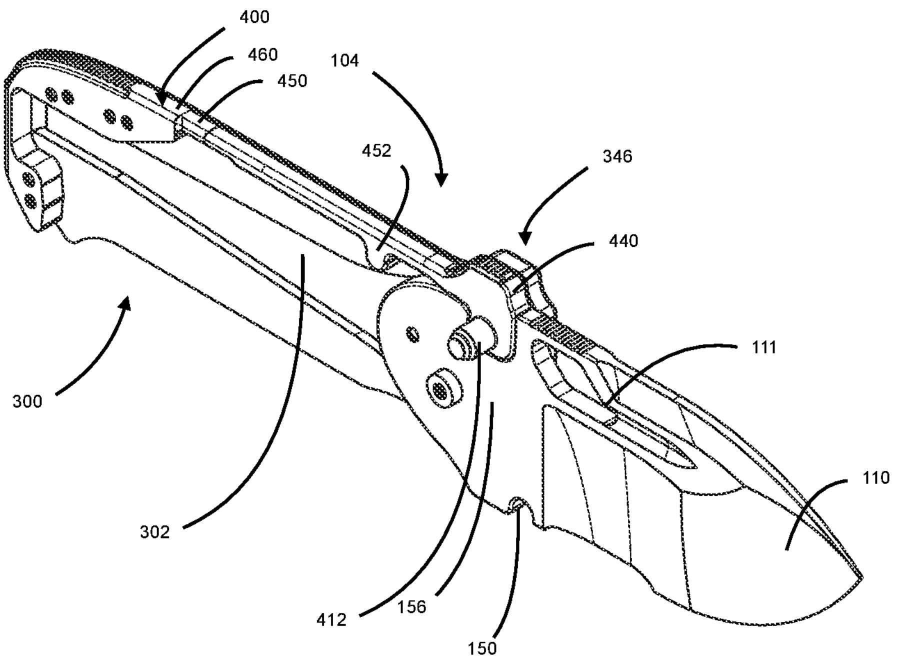
FIG. 21 is a perspective view of the embodiment of the blade-barrel pivot nut-spine-right handle assembly, depicted in FIG. 20, with the blade extended and in a locked configuration.

Referring to FIG. 21, a perspective view is shown of the blade-barrel pivot nut-spine-right handle assembly 104 comprising a blade 110, a barrel pivot nut 700, a spine 400, and a right handle 200, depicted in FIG. 20, with the blade extended and in a locked configuration. Spine 400, which may be pliant in some preferred embodiments, may have a choil flange 452, which may be detachably coupled to the choil 150 of the blade 110 when the blade is in a folded configuration (FIG. 20 does not show the blade 110 in a folded configuration). In some embodiments, as shown in FIG. 20, when the blade 110 is in a locked configuration, spine locking tooth 440 may be detachably coupled to blade groove member 156 and may be disposed within a blade groove that is defined by blade groove member 156, thereby locking blade 110 in a locked configuration. The spine locking tooth 440 may be adjacent to wide slot member 346 of the left handle 300, and in some embodiments, the spine locking tooth 440 may be detachably coupled to wide slot member 346 of the left handle 300. Right lug member 412, shown in this figure, and left lug member 414, not shown in this figure, may be lifted or lowered by a user for selectively opening or selectively closing the locking mechanism by flexing spine 400; right lug member 412 may be sized to fit into wide slot member 246 (not shown in this figure), neck 244 (not shown in this figure) and narrow slot member 242 (not shown in this figure). The blade 110 may have a nail nick 111; nail nick 111 may define a nail nick notch.

Figure 22:
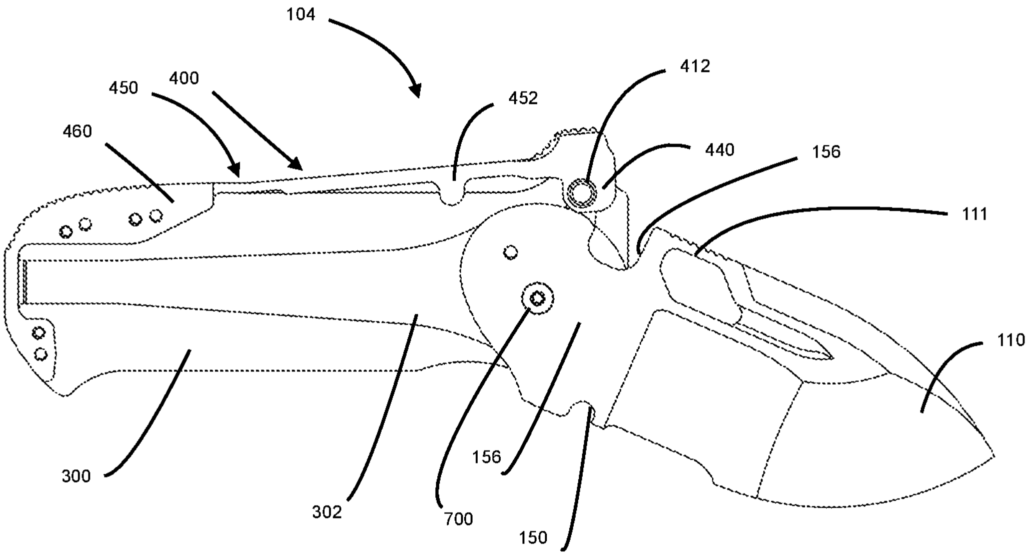
FIG. 22 shows the right-side view of the embodiment of the blade-barrel pivot nut-spine-right handle assembly shown in FIG. 20, with the blade being shown in a non-extended, folding, unlocked configuration.

Referring to FIG. 22, the right-side view is shown of a blade-barrel nut-spine-right handle assembly 104 comprising a blade 110, a barrel pivot nut 700, a spine 400, and a right handle 200, with the blade being shown in a non-extended, folding, unlocked configuration. Spine 400 may be flexed, as shown in FIG. 22, and may be in an unlocked configuration, as shown in FIG. 22, wherein spine locking tooth 440 is not disposed in blade groove member 156. A user may apply upward pressure on right lug member 412 so as to lift the pliant spine 400 out of the blade groove member 156, thereby unlocking both the spine 400 and the blade 110. In some embodiments, spine locking tooth 440 may be snapped into the blade groove member 156 when blade 110 is rotated counterclockwise (not yet shown in this FIG. 22). The blade 110 may have a nail nick 111; nail nick 111 may define a nail nick notch.

Figure 23:
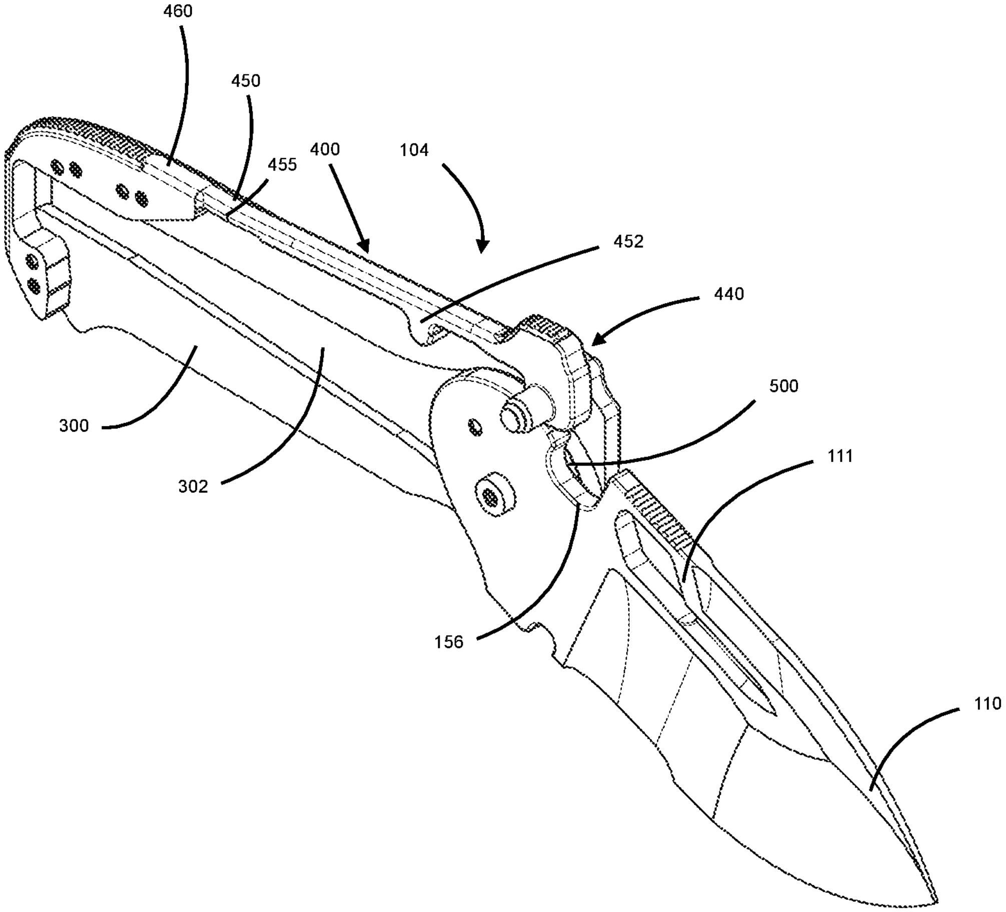
FIG. 23 shows a right-side perspective view of an embodiment of a blade-barrel nut-spine-right handle assembly.

Referring to FIG. 23, an embodiment is shown of a blade-barrel nut-spine-right handle assembly 104 comprising a blade 110, a barrel pivot nut 700, a spine 400, and a right handle 200 wherein the pliant spine 400 has been elevated such that the spine locking tooth 440 is not disposed in the blade groove member 156 and the blade 110 is in an unlocked configuration. In some embodiments, spine flexible portion 450 may be adjacent to spine base element 460 and spine flexible portion 450 may be less thick than spine base element 460, allowing spine flexible portion 450 to be flexed relative to spine base element 460. Spine flexible portion 450 may have a spine.

Flex-point element 455 upon which spine flexible portion 450 flexes when a force is applied to a front portion of the spine 400; spine flex point element 455 may be an area of the spine 400 that is substantially at the center point of spine flexible portion 450. Rotatable cam 500 is barely visible in this FIG. 23. The blade 110 may have a nail nick 111; nail nick 111 may define a nail nick notch.

Figure 24:
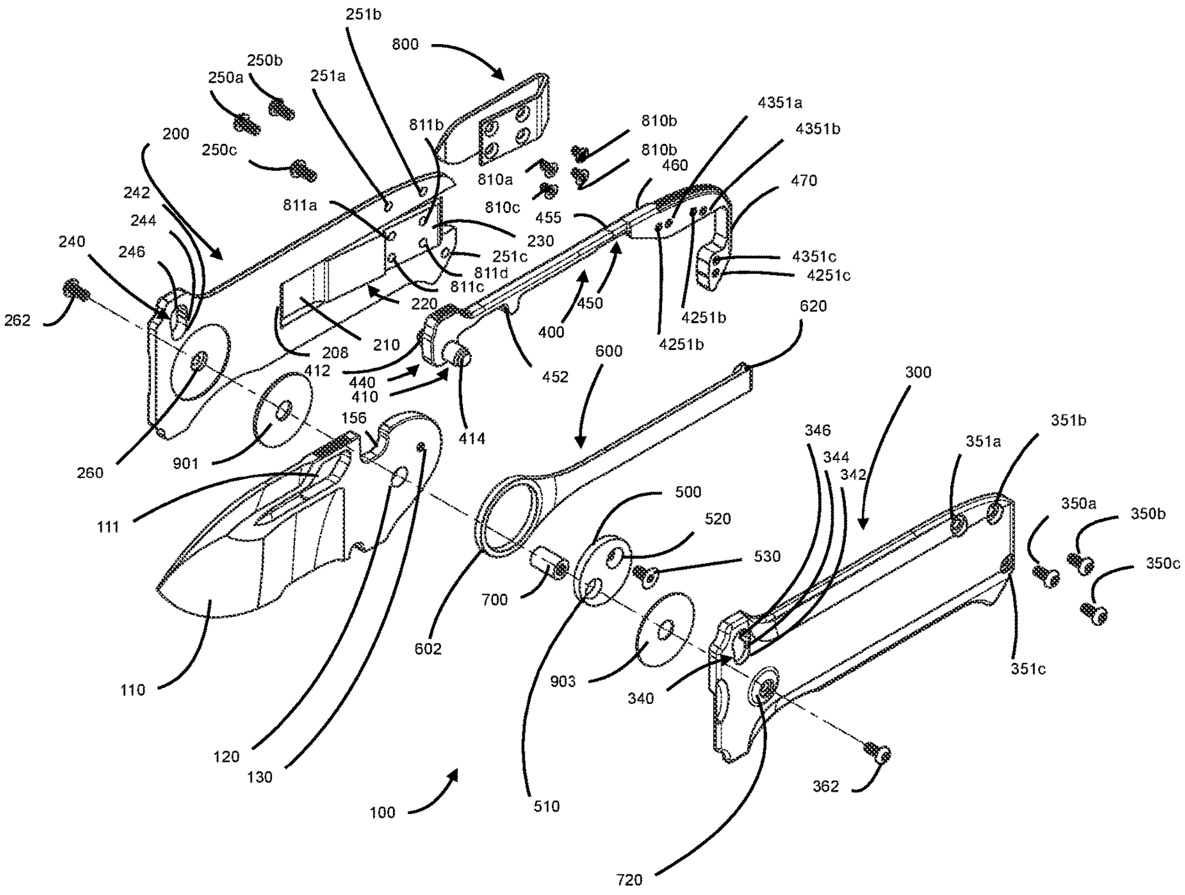
FIG. 24 shows an exploded view of an embodiment of an unassembled hand tool assembly.

Referring to FIG. 24, an exploded view is shown of an embodiment of an unassembled hand tool assembly 100; the following parts of hand tool assembly 100 are shown in FIG. 24 (for clarification, a first partially-assembled hand tool assembly 102 without the left handle and spine is not shown in FIG. 24, and a blade-barrel pivot nut-spine-right handle assembly 104 is not shown in FIG. 24, the blade-barrel pivot nut-spine-right handle assembly 104 comprising a blade 110, a barrel pivot nut 700, a spine 400, and a right handle 200):

- a hand tool assembly 100;
- a blade 110;
- a nail nick 111 defining a nail nick notch;
- a blade pivot aperture member 120 defining a blade pivot aperture;
- a blade rotatable cam anchor aperture member 130, which may be threaded;
- a right handle 200;
- an attachment clip 205;
- a stable support 208 (a portion of the right handle 200 adjacent to pliant portion 210; in the preferred embodiments the thickness of the stable support 208 is greater than the thickness of the pliant portion 210, thereby allowing the pliant portion 210 to be flexed relative to stable support 208 when sufficient force is exerted on the distal end of the elongated flange);
- a pliant portion 210 which is adjacent to stable support 208 of right handle 200;
- a pliant elongated flange 220;
- a mount 230 of the pliant elongated flange 220 of the right handle 200;
- a lug slot element 240 of right handle 200 defining a lug slot for receiving the lug 910, the lug slot element 240 having in some preferred embodiments a narrow slot member 242, a neck 244, and a wide slot member 246;
- a narrow slot member 242;
- a neck 244;
- a wide slot member 246;
- a first fastener **250*a* of the right handle 200**;
- a second fastener **250*b* of the right handle 200**;
- a third fastener **250*c* of right handle 200**;

a first threaded portion 260 of the right handle 200;
first barrel nut fastener 262;
a left handle 300;
a lug slot element 340 of left handle 300 defining a lug slot for receiving the lug 410, the lug slot element 340 having in some preferred embodiments a narrow slot member 342, a neck 344, and a wide slot member 346;
narrow slot member 342;
a neck 344;
a wide slot member 346;
a second barrel nut fastener 362;
a spine 400;
a lug 410 coupled to the spine 400;
a right lug member 412 of the lug 410;
a left lug member 414 of the lug 410;
a spine locking tooth 440;
a rotatable cam 500, which may be a disc or shaped like a disc;
a rotatable cam pivot aperture element 510 defining a pivot hole;
a rotatable cam mount aperture element 520 defining a mount hole;
a rotatable cam mount fastener 530;
a rotatable cam arm 600;
a proximal member 602 of the rotatable cam arm 600;
a cam arm lifter 620; a barrel pivot nut 700;
a barrel nut 720, which may be configured to detachably receive a second barrel nut fastener 362;
a liftable clip 800;
a clip actuator 801;
a first clip fastener 810*a;*
a second clip fastener 810*b;*
a third clip fastener 810*c;*
a fourth clip fastener 810*d;*
a first washer bearing 901; and,
a second washer bearing 903.

Figure 25:
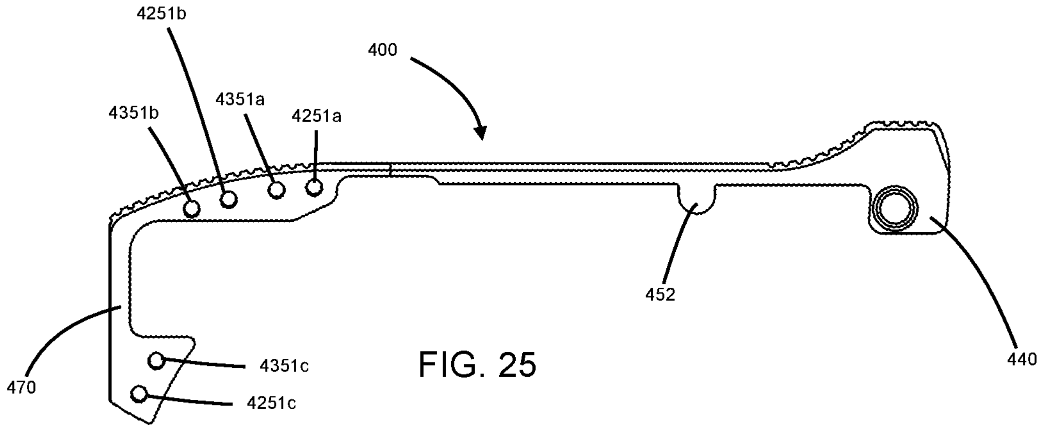
FIG. 25 shows a right-side view of a spine.

Referring to FIG. 25, a right-side view of an embodiment of spine 400 is shown; spine 400 may have a spine locking tooth 440 which may be configured to be detachably disposed in a blade groove defined by blade groove member 156; in some embodiments, spine locking tooth 440 may be configured to fit snugly in the blade groove defined by blade groove member 156. Clip-clearance feature 470 of spine 400 may be located at an opposite end of the spine 400 in relation to spine locking tooth 440; clip-clearance feature 470 may define a cavity that may receive or partially-receive the liftable clip 800. In some embodiments, spine 400 may have at least one fastener-receiving element defining an aperture for receiving at least one of the following fasteners shown in FIG. 24: first fastener 250*a*, second fastener 250*b*, third fastener 250*c*; fourth fastener 350*a*, fifth fastener 350*b*, and sixth fastener 350*c*. In some embodiments, as shown in this figure, spine 400 may have a fastener receiving element 4251*a* defining a fastener-receiving cavity, a fastener receiving element 4351*a* defining a fastener-receiving cavity, a fastener receiving element 4251*b* defining a fastener-receiving cavity, a fastener receiving element 4351*b* defining a fastener-receiving cavity, a fastener receiving element 4251*c* defining a fastener-receiving cavity, and a fastener receiving element 4351*c* defining a fastener-receiving cavity. Although not shown in this figure, fasteners may be used to couple the spine 400 to an adjacent handle, such as the right side of the spine 400 to the right handle 200 and the left side of the spine 400 to the left handle 300.

In some embodiments, spine flexible portion 450 may be adjacent to spine base element 460 and spine flexible portion 450 may be less thick than spine base element 460, allowing spine flexible portion 450 to be flexed relative to spine base element 460. Spine flexible portion 450 may have a spine flex-point element 455 upon which spine flexible portion 450 flexes when a force is applied to a front portion of the spine 400; spine flex point element 455 may be an area of the spine 400 that is substantially at the center point of spine flexible portion 450.

Figure 26:
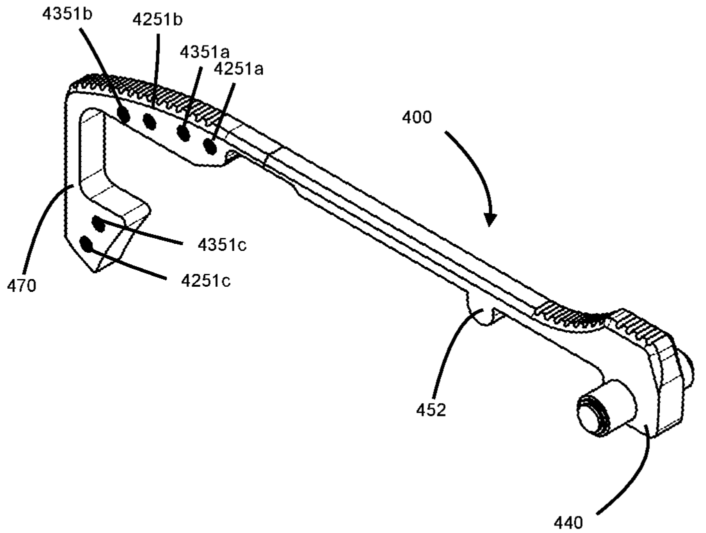
FIG. 26 shows a perspective view of a spine.

Referring to FIG. 26, a perspective view of an embodiment of spine 400 is shown; spine 400 may have a spine locking tooth 440 which may be configured to be detachably disposed in a blade groove defined by blade groove member 156; in some embodiments, spine locking tooth 440 may be configured to mate snugly in the blade groove defined by blade groove member 156. Clip-clearance feature 470 of spine 400 may be located at an opposite end of the spine 400 in relation to spine locking tooth 440; clip-clearance feature 470 may define a cavity that may receive or partially-receive the liftable clip 800. In some embodiments, spine 400 may have at least one fastener-receiving element defining an aperture for receiving at least one of the following fasteners shown in FIG. 24: first fastener 250*a*, second fastener 250*b*, third fastener 250*c*; fourth fastener 350*a*, fifth fastener 350*b*, and sixth fastener 350*c*. In some embodiments, as shown in this figure, spine 400 may have a fastener receiving element 4251*a* defining a fastener-receiving cavity, a fastener receiving element 4351*a* defining a fastener-receiving cavity, a fastener receiving element 4251*b* defining a fastener-receiving cavity, a fastener receiving element 4351*b* defining a fastener-receiving cavity, a fastener receiving element 4251*c* defining a fastener-receiving cavity, and a fastener receiving element 4351*c* defining a fastener-receiving cavity. Although not shown in this figure, fasteners may be used to couple the spine 400 to an adjacent handle, such as the right side of the spine 400 to the right handle 200 and the left side of the spine 400 to the left handle 300.

In some embodiments, spine flexible portion 450 may be adjacent to spine base element 460 and spine flexible portion 450 may be less thick than spine base element 460, allowing spine flexible portion 450 to be flexed relative to spine base element 460. Spine flexible portion 450 may have a spine flex-point element 455 upon which spine flexible portion 450 flexes when a force is applied to a front portion of the spine 400; spine flex point element 455 may be an area of the spine 400 that is substantially at the center point of spine flexible portion 450.

Referring to FIG. 27, in some embodiments of right handle 200, attachment clip 205 may comprise a pliant elongated flange 220 undetachably coupled to a liftable clip 800. The embodiment of the right handle shown in FIG. 27 may be similar to the embodiments of the right handle depicted elsewhere in this specification, other than the liftable clip 800 may be undetachable from the pliant elongated flange 220.

Referring to FIG. 28, in some embodiments of right handle 200, attachment clip 205 may comprise a pliant elongated flange 220 undetachably coupled to a liftable clip 800. The embodiment of the right handle shown in FIG. 27 may be similar to the embodiments of the right handle depicted elsewhere in this specification, other than the liftable clip 800 may be undetachable from the pliant elongated flange 220. Clip actuator 801 is shown.

It will be readily understood that the components of the present invention, as generally described with reference to the drawings herein, could be implemented in a wide variety of different configurations. Thus, the following more detailed description of the embodiments of the system and method of the present invention is not intended to limit the scope of the invention but is merely representative of various embodiments of the invention. Unless explicitly stated, the use of "or" means and/or, that is, this the non-exclusive meaning of or.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A hand tool assembly comprising:

an implement;

a handle assembly comprising a left handle, a right handle, and at least one fastener; an attachment clip;

the attachment clip comprising a clip actuator;

a spine, comprising a main body, coupled to the handle assembly; a rotatable cam coupled to the implement;

a rotatable cam arm comprising a proximal member and a distal member, wherein the distal member comprises a rotatable cam arm lifter, wherein the proximal member of the rotatable cam arm is coupled to the rotatable cam;

wherein the implement is a blade comprising a blade pivot aperture member defining a blade pivot aperture and a blade rotatable cam anchor aperture member defining an anchor aperture member, wherein the rotatable cam is coupled to the blade via a fastener disposed within the blade rotatable cam anchor aperture member and via a fastener disposed within the blade pivot aperture member.

2. The hand tool assembly of claim 1, wherein the rotatable cam comprises a pivot aperture element defining a pivot aperture, wherein the pivot aperture element is positioned off-center from a geometrical center of the rotatable cam, and wherein the attachment clip is a pocket clip.

3. The hand tool assembly of claim 2, wherein the clip actuator comprises a ramp.

4. The hand tool assembly of claim 2, wherein the cam arm lifter comprises a ramp and wherein the clip actuator comprises a ramp, wherein the proximal member is ring-shaped and defines a ring-shaped cavity, wherein the rotatable cam is disposed in the ring-shaped cavity and circumscribed by the proximal member.

5. The hand tool assembly of claim 2, the blade extending from the handle assembly, a main body of the blade being horizontally-aligned with a main body of the left handle and a main body of the right handle; the rotatable cam being in a rotated position, such that the rotatable cam arm is coupled to the clip actuator of the clip of the attachment clip and positioned so as to not extend the clip actuator, wherein the attachment clip is coupled to a pliant elongated flange coupled to the right handle.

6. The hand tool assembly of claim 2, wherein the clip comprises a clip actuator, wherein the clip is coupled to a pliant elongated flange flanked by a first channel and flanked by a second channel; the pliant elongated flange is coupled to the left handle; the pliant elongated flange is configured to be flexed so as to allow the clip to be lifted by the rotatable cam arm lifter.

7. The hand tool assembly of claim 2, the blade not extending from the handle assembly but being in a folded configuration, such that the rotatable cam has been rotated to a position so as to position the rotatable cam arm so that the cam arm lifter is lifting the clip actuator and maintaining the attachment clip in an extended configuration; wherein the attachment clip further comprises a stable support coupled to a pliant portion of the right handle.

8. The hand tool assembly of claim 2 wherein the cam arm lifter comprises at least one object selected from the group consisting of a bearing assembly comprising a roller bearing, at least one vertically-aligned flange; a ramp, and a milled ramp.

9. The hand tool assembly of claim 2 wherein the left handle further comprises a lug slot element, wherein the lug slot element comprises a wide slot member; a neck; and a narrow slot member;

the right handle further comprises a lug slot element, wherein the lug slot element comprises a wide slot member; a neck; and a narrow slot member;

wherein the spine locking tooth comprises a left lug member and a right lug member, wherein when the blade is in a locked configuration the left lug member is disposed within the narrow slot member of the lug slot element of the left handle; and, wherein when the blade is in a locked configuration the right lug member is disposed within the narrow slot member of the lug slot element of the right handle.

10. The hand tool assembly of claim 9 wherein the left lug member and the right lug member are substantially perpendicular to a main body of the spine.

11. The hand tool assembly of claim 10 wherein the height of the spine flexible portion is less than the height of the spine base element.

12. The hand tool assembly of claim 1, wherein the cam arm lifter comprises a ramp.

13. The hand tool assembly of claim 1 further comprising a locking assembly, the locking assembly comprising a pliant spine comprising a spine flexible portion having a height;

a spine flex-point element;

a spine base element having a height;

a spine locking tooth located at a distal end of the spine; and, at least one lug member located at the distal end of the spine.

14. A method for using a hand tool assembly having a blade in an extended configuration and an attachment clip in a retracted configuration, comprising the following steps:

providing a hand tool assembly comprising a handle assembly;

an attachment clip comprising a clip and a clip actuator;

a blade coupled to a rotatable cam, the rotatable cam being coupled to a rotatable cam arm, the rotatable cam arm comprising a rotatable cam arm lifter; the blade comprising a blade pivot aperture member wherein a barrel pivot nut is disposed within the blade pivot aperture member, wherein the barrel pivot nut is coupled to the handle assembly; wherein in the rotatable cam is coupled to the rotatable cam arm and disposed within the proximal member of the rotatable cam arm, the clip being coupled to a pliant elongated flange;

rotating the blade around a longitudinal axis of the barrel pivot nut and simultaneously rotating the rotatable cam and disposing the blade of the hand tool assembly within the handle assembly, and, continuing to rotate the rotatable cam via rotating the blade until the blade is in a closed configuration, thereby positioning the cam arm lifter in a proximal configuration such that the cam arm lifter is lifting the clip actuator while extending the clip of the attachment clip from the handle assembly.

15. The method of using a hand tool assembly of claim 14, further comprising the steps of detachably clamping the attachment clip onto an object selected from the group consisting of a layer of clothing and a belt.

16. The method of using a hand tool assembly of claim 15, further comprising the steps of unclamping the attachment clip from the object;

unfolding the blade of the hand tool assembly while simultaneously rotating the cam and the cam arm until the cam arm lifter no longer is lifting the clip actuator and the attachment clip is retracted into the handle assembly.

* * * * *